United States Patent [19]
Tamai et al.

[11] Patent Number: 5,640,080
[45] Date of Patent: Jun. 17, 1997

[54] SECONDARY BATTERY CHARGER

[75] Inventors: Mikitaka Tamai; Tooru Amazutsumi, both of Hyogo, Japan

[73] Assignee: Sanyo Electric Co., Ltd., Osaka, Japan

[21] Appl. No.: 498,610

[22] Filed: Jul. 6, 1995

[30] Foreign Application Priority Data

Jul. 29, 1994 [JP] Japan .................................. 6-178431
Mar. 3, 1995 [JP] Japan .................................. 7-044135

[51] Int. Cl.⁶ ...................................... H02J 7/00
[52] U.S. Cl. ................................ 320/21; 320/39; 320/48
[58] Field of Search ................... 320/22–32, 39, 320/48, 43–44, 20–21

[56] References Cited

U.S. PATENT DOCUMENTS 5,172,044 12/1992 Sasaki et al. ........................... 320/22

FOREIGN PATENT DOCUMENTS 2119539 5/1990 Japan .
6113474 4/1994 Japan .

*Primary Examiner*—Aditya Krishnan
*Attorney, Agent, or Firm*—Loeb & Loeb LLP

[57] ABSTRACT

A charging apparatus charges a secondary battery in alternating charging and rest periods. The charge amount supplied in the charging periods is restricted to an amount which reduces or eliminates deterioration of the secondary battery by overcharging.

26 Claims, 12 Drawing Sheets

SECONDARY BATTERY CHARGER

FIELD OF THE INVENTION

The present invention relates generally to secondary batteries, and more particularly, to a method and apparatus for charging a secondary battery.

BACKGROUND OF THE INVENTION

U.S. Pat. No. 5,172,044 describes a charging method related to a secondary battery. In this method, the secondary battery is first charged with a constant current, until the terminal voltage of the secondary battery reaches a predetermined voltage value. After that, the secondary battery is charged with a constant voltage of a predetermined voltage value to prevent the battery from being overcharged by an overvoltage. To reduce charging time, a larger current value may be selected during the constant current charging interval. However, the charging current should be limited to a current value which does not excessively deteriorate the charging properties of the secondary battery.

Japanese Patent Laid-open No. HEI 2-119539 also describes a charging method in which a secondary battery is charged with a constant current until the terminal voltage of the secondary battery reaches a first predetermined voltage value. However, the secondary battery is then charged with a second predetermined constant voltage value which is lower than the first predetermined voltage value. In this method, charging the secondary battery with a constant current to the higher first predetermined voltage value, can reduce charging time. However, if the first predetermined voltage value is set excessively high, the charging properties of the secondary battery can deteriorate excessively.

To address the above problems, one of the inventors of the present invention developed a charging method which, as described in Japanese Patent Laid-open No. HEI 6-113474, charging is started and stopped alternately to charge the battery with pulses. This charging method reduces charging time without causing excessive deterioration by overcharging the secondary battery. In this method, at the beginning of charging, the secondary battery is first charged with a constant current until the terminal voltage of the secondary battery reaches a first predetermined voltage value. After that, the secondary battery is pulse charged with pulses at a constant voltage of the first predetermined voltage value. After the pulse charging, the secondary battery is charged with a constant voltage value of a second predetermined voltage value which is lower than the first predetermined voltage value.

In this method, during the pulse charging, the secondary battery is charged with the first predetermined voltage value higher than the second predetermined voltage value. It has been found that pulse charging in which charging is started and stopped alternately, reduces deterioration of the secondary battery caused by an overcharge, as compared to continuous charging.

This charging method has the following disadvantages. In this charging method, the secondary battery is first charged with a constant current, then with pulses and finally with a constant voltage. Therefore, the charging circuit for this method can be complicated. In addition, during the pulse charging interval, the secondary battery is charged with the high first predetermined voltage value for the same period in each pulse. As charging progresses toward a full charge level, charging for the same duration in each pulse can cause deterioration of the charging property of the secondary battery by an overcharge.

SUMMARY OF THE INVENTION

It is an object of the present invention to provide a method of charging a secondary battery in which the secondary battery is charged by a simple charging circuit.

It is another object of the present invention to provide a method of charging a secondary battery which reduces deterioration of the secondary battery caused by overcharging.

These and other objects are achieved by a method of charging, in accordance with one embodiment of the present invention, which comprises charging a secondary battery in alternating charging and rest periods. The amount of charge supplied in each charging period followed by a rest period is limited, particularly as the battery approaches the full charge level, so as to reduce or eliminate deterioration of the battery caused by overcharging.

DETAILED DESCRIPTION OF THE PREFERRED EMBODIMENTS

The present invention is directed to a charging apparatus which charges a secondary battery. During each charging period, the battery is charged with a charging current, preferably a constant current, in alternating charging and rest periods. In the rest periods, the charging current is reduced or preferably stopped completely. In accordance with one aspect of the invention, the charging is restricted in such a manner as to reduce or eliminate deterioration of the battery caused by overcharging. Furthermore, the improved charging may be readily implemented with a relatively simple charging circuit.

Figure 1:
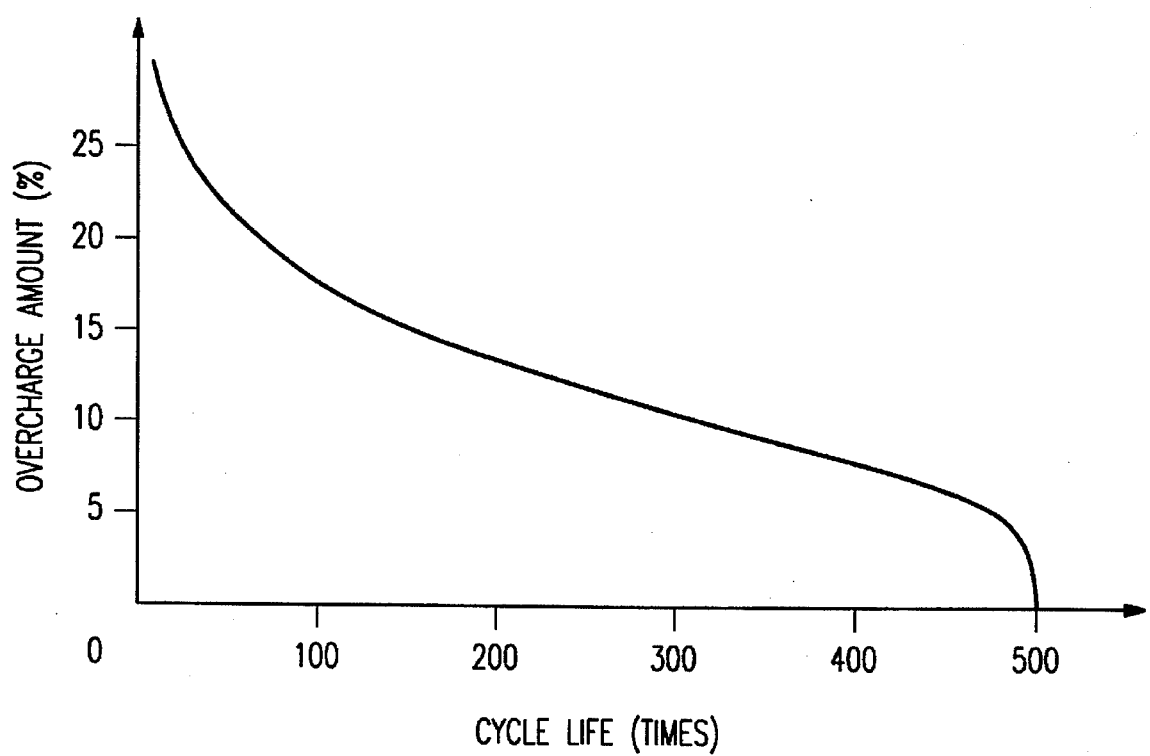
FIG. 1 is a graph showing a relationship between overcharge amounts and their effect on the cycle life of a nonaqueous, organic electrolyte, lithium secondary battery.

FIG. 1 shows the relationship between the amount of overcharge and its effect on the cycle life of a nonaqueous, organic electrolyte, lithium secondary battery (hereinafter referred to as a lithium ion secondary battery). The quantity referred to as "overcharge amount" on the vertical axis is the amount of charge beyond a full charge level, and is represented as a percentage above a full charge. As shown in FIG. 1, when the overcharge amount is more than 5%, the cycle life of the lithium ion secondary battery decreases rapidly. Thus, the lithium ion secondary battery is rapidly deteriorated by an overcharge above the 5% level. On the other hand, when the overcharge amount is less than 5%, the cycle life does not decrease as rapidly. When the overcharge amount is less than 3%, there is a very little decrease in the cycle life of the lithium ion secondary battery. Moreover, when the overcharge amount is within 1%, there is substantially no decrease in the cycle life of the lithium ion secondary battery.

Therefore, in accordance with one embodiment of the present invention, in order to reduce or eliminate deterioration of the lithium ion secondary battery caused by overcharging, the amount of charge supplied to the battery during a charging period is limited to within 5% of the full charge amount. Preferably, the charge amount during a charging period is set within 3%. More preferably, the charge amount during the charging period is set within 1%.

When secondary batteries of any type are overcharged, the properties of the secondary batteries usually deteriorate. For example, the cycle life of the secondary battery is typically decreased by overcharging. A lithium ion secondary battery is particularly susceptible to weakening as a result of excessive charging. In the following embodiments, a lithium ion secondary battery is used as the secondary battery. However, the present invention is applicable to other types of secondary batteries as well.

Figure 2:
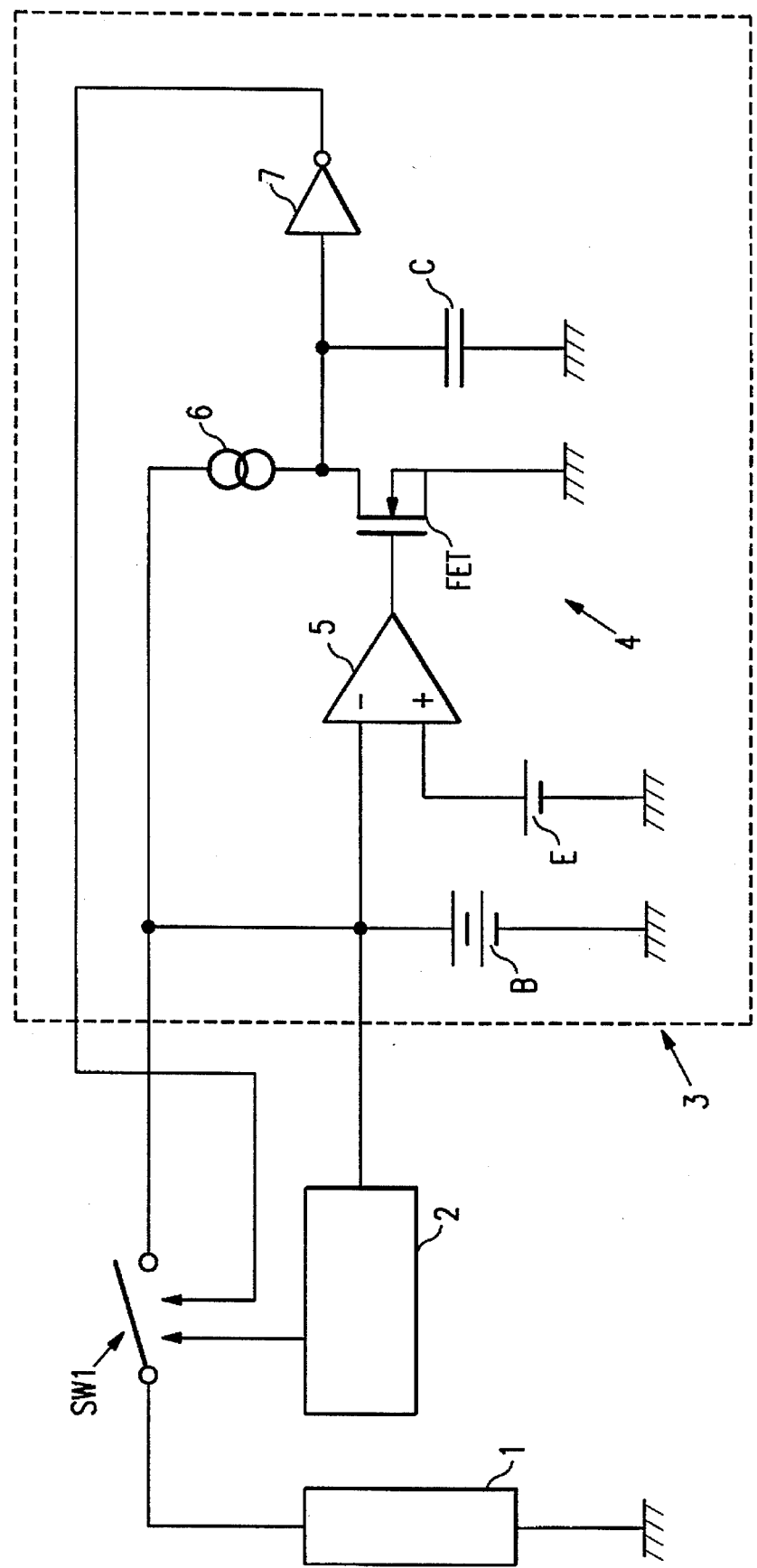
FIG. 2 is a charging circuit of a charging apparatus in accordance with one embodiment of the present invention.

FIG. 2 shows a charging circuit of a charging apparatus. The charging apparatus charges a battery pack 3 which includes two secondary batteries B connected in series. In a preferred embodiment, the secondary batteries B comprise lithium ion secondary batteries.

The charging apparatus comprises a direct current power source 1, a switching element SW1, a control device 2. The direct current power source 1 converts the line alternating current (e.g., AC current at 100 volts) to a direct current which has a suitable voltage for charging the secondary batteries B. The direct current power source 1 also provides a predetermined constant current (e.g., a constant current of about 3C).

The switching element SW1 comprises a semiconductor switching element, such as, for example, a transistor, or an FET. When the switching element SW1 is ON, the apparatus charges the secondary batteries B with a constant current. On the other hand, when the switching element SW1 is OFF, the apparatus stops charging.

The control device 2 repetitively turns the switching element SW1 on and off to permit the apparatus to repetitively charge the batteries in alternating charging and rest periods. The battery pack 3 includes an overcharge protection circuit 4 which reduces or eliminates the overcharging of the secondary batteries B, by monitoring the terminal voltage of the secondary batteries B. The overcharge protection circuit 4 comprises a differential amplifier 5, a reference voltage E (e.g., 9.0 V), a MOSFET, a constant current source 6 and an inverter 7. The differential amplifier 5 compares the terminal voltage of the secondary batteries B with the reference voltage E. The output of the differential amplifier 5 turns the MOSFET on and off. A capacitor C is connected in parallel with the MOSFET. The constant current source 6 provides the capacitor C and the MOSFET with a constant current. The inverter 7 inverts the terminal voltage of the capacitor C. The output of the inverter 7 turns the switching element SW1 on and off.

The overcharge protection circuit 4 operates in the following manner. When the terminal voltage of the secondary batteries B is lower than the reference voltage E, the output of the differential amplifier 5 is high, and the MOSFET is turned on, shorting the capacitor C. Then, the terminal voltage of the capacitor C becomes substantially 0 V causing the inverter 7 to output a high signal which maintains the switching element SW1 on, permitting charging to continue.

On the other hand, when the terminal voltage of the secondary batteries B is higher than the reference voltage E (e.g., 9 V), the output of the differential amplifier 5 is low, and the MOSFET is turned off. As a result, the capacitor C is charged by the constant current source 6 such that the terminal voltage of the capacitor C gradually increases. When the terminal voltage of the capacitor C reaches the predetermined threshold voltage of the inverter 7, the inverter 7 outputs a low signal which turns the switching element SW1 off. In this embodiment, the terminal voltage of the capacitor C reaches the predetermined threshold voltage value 60 msec. after the MOSFET is turned off. Thus, 60 msec. after the MOSFET is turned off, the inverter 7 outputs a low signal which turns off the switching element SW1 to terminate the charging period.

The amount of time required for the terminal voltage of the capacitor C to reach the predetermined threshold voltage is a function of the current value of the constant current source 6 and the capacity of the capacitor C. By altering these values, the delay between the change of state of the MOSFET and the subsequent switching off of the switch SW1 may be readily set.

It is seen from the above that when the terminal voltage of the secondary battery B exceeds the reference voltage E by more than 60 msec., the switch element SW1 turns off to terminate charging. In this manner, the overcharge protection circuit 4 prevents the secondary batteries B from being overcharged. Such an overcharge may occur, for example, if the constant source 1 or the control circuit 2 malfunctions. Note, if the terminal voltage of the secondary batteries B exceeds the reference voltage E but falls below the voltage E within the 60 msec. period, the switch element SW1 remains on to continue charging.

In the above mentioned overcharge protection circuit 4, the terminal voltage of the secondary batteries B which is sampled is the series-connected voltage. In an alternative embodiment, the overcharge protection circuit 4 can sample the terminal voltage of each of the secondary batteries B individually. Then, when the terminal voltage of any one of the secondary batteries B exceeds the particular reference voltage for more than the predetermined time period, the circuit 4 can turn off the switching element SW1 to terminate charging.

Figure 4:
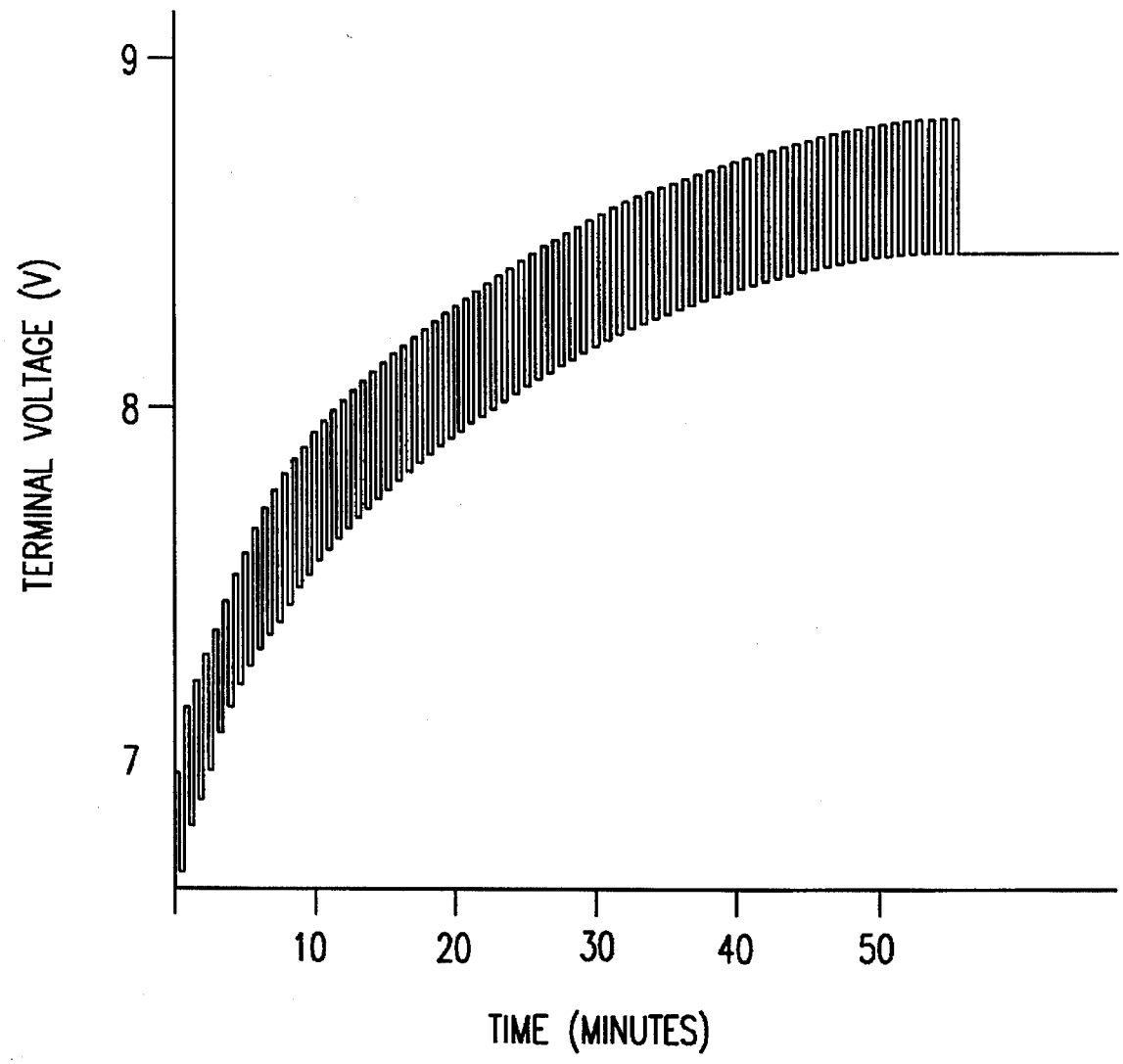
FIG. 4 is a graph of the terminal voltage of the secondary battery being charged in accordance with the first embodiment of the present embodiment.
Figure 5:
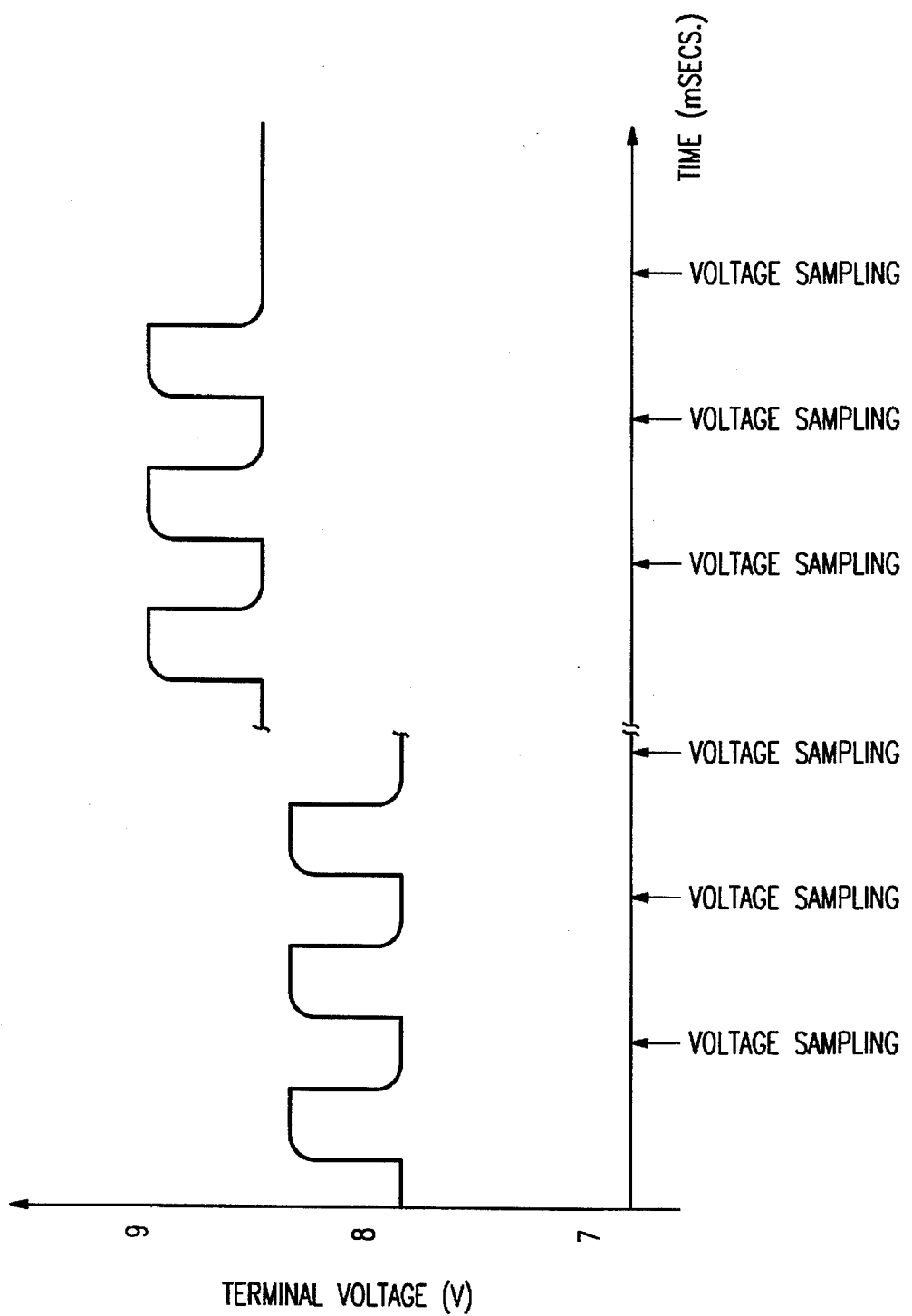
FIG. 5 is a detailed graph of FIG. 4 which has a lengthened time axis.

The charging method in accordance with a first embodiment of the control device 2 will be described below with reference to a flow chart shown in FIG. 3. FIG. 4 shows a graph of the terminal voltage of the lithium ion battery in this embodiment. FIG. 5 shows a detailed view of the graph of FIG. 4 in which the time axis is expanded.

In the first embodiment, the charging apparatus charges the secondary battery with a constant current in alternating charging periods and rest periods in which charging is stopped. In one aspect of the invention, the amount of charge supplied to the battery during each charging period followed by one rest period is limited to an amount which does not cause a deterioration of the secondary battery as it approaches a full charge level.

Regarding the charge amount which does not cause a deterioration of the secondary battery adjacent the full charge level, when a lithium ion secondary battery is used, the charge amount during each charging period is preferably limited to 5% of the full charge capacity in accordance with FIG. 1 above. More preferably, the charge amount during each charging period should not exceed 3%. Still more preferably, the charge amount during each charging period should be within 1%. For example, if the lithium ion secondary battery has a full charge capacity of 1000 mAh, 5% of this full charge amount of 1000 mAh is 50 mAh. Therefore, if the charging current is 2A, for example, each charging period is preferably set at 90 sec (=25 mh). Alternatively, if the charge amount during each charging period is set to 1% of the full charge capacity of 1000 mAh, each charging period is18 sec (=5 mh) in duration.

Figure 3:
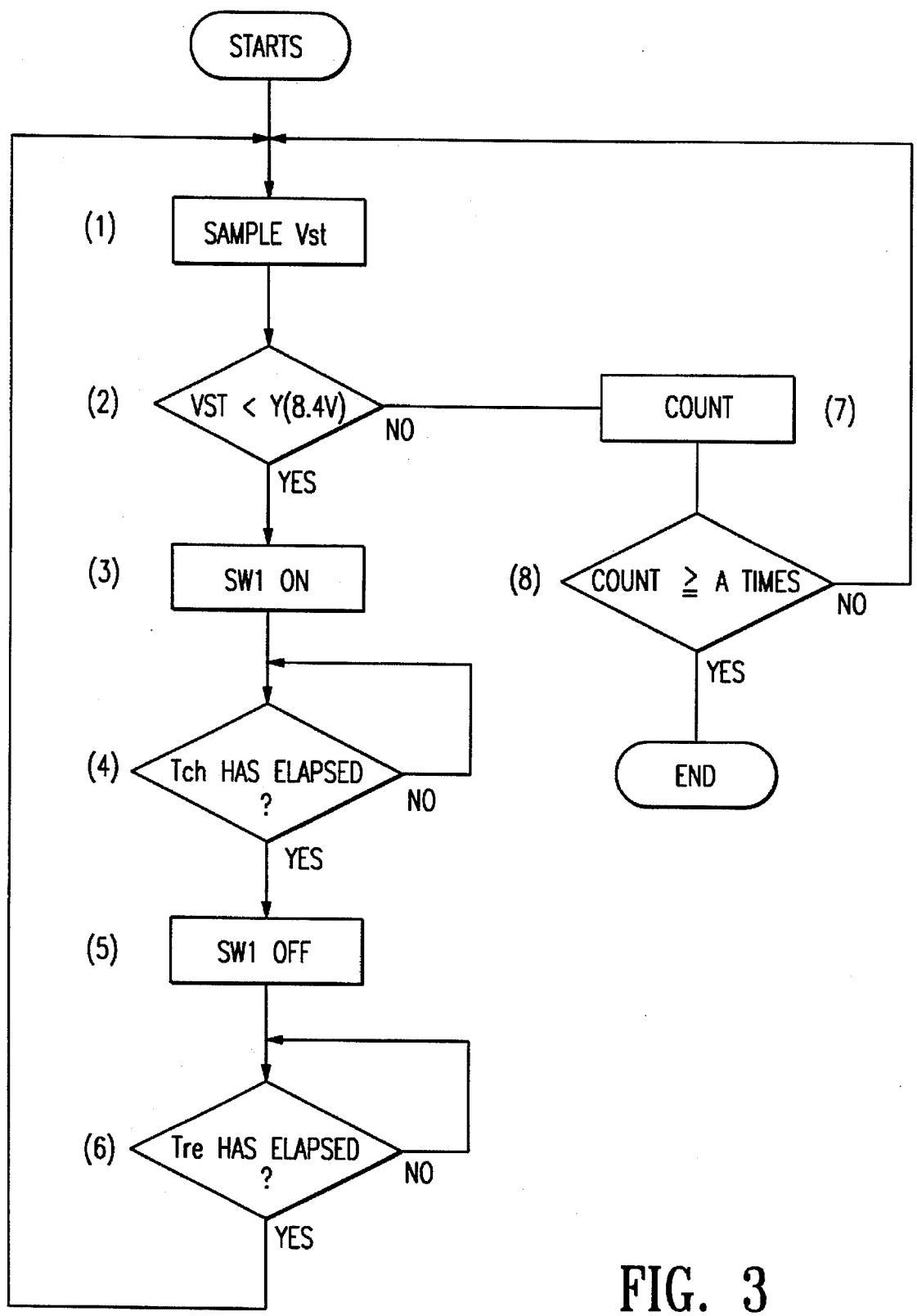
FIG. 3 is a flow chart showing a method of charging a secondary battery in accordance with a first embodiment of the present embodiment.

As shown in the flow chart of FIG. 3, after the apparatus starts the process, the control device 2 samples the stopped charging terminal voltage (Vst) of the secondary batteries B, during the rest periods in which charging is stopped. A determination is made in step 2 as to whether the sampled stopped charging terminal voltage (Vst) is less than a predetermined voltage value Y (e.g., 8.4 V).

If the sampled stopped charging terminal voltage (Vst) is less than the predetermined voltage value (Y), the control device on in step 3 to resume charging back on in step 3 to resume charging. In step 4, the control device 2 starts a charging timer for timing a predetermined charging period Tch (e.g., 1.5 msec). The charging timer is installed inside the control device 2. Then, a determination is made as to whether the predetermined charging period (Tch) has elapsed in step 4.

If the predetermined charging period (Tch) has not elapsed, the control device 2 continues to charge the secondary batteries B. Once the predetermined charging period (Tch) has elapsed, the control device 2 turns off the switching element SW1 in step 5 to interrupt the charging.

In step 6, the control device 2 starts a rest period timer for timing a predetermined rest period Tre (e.g., 1.5 msec). The rest period timer is installed inside the control device 2. Then, a determination is made as to whether the predetermined rest period (Tre) has elapsed in step 6. If the predetermined rest period (Tre) has not elapsed, the control device 2 continues to maintain the switching element SW1 in the off state.

Once the rest period elapses, the process repeats steps 1–6. Then, in step 2, if a determination is made that the sampled stopped charging terminal voltage (Vst) is equal to or more than the predetermined voltage value (Y), a counter is incremented in step 7. A determination is made in step 8 as to whether the number of times that the sampled stopped charging voltage Vst has exceeded the predetermined voltage Y (as represented by the count in step 7) is equal to or more than a predetermined number A (e.g., 3 times). If the count in step 8 is less than the consecutive predetermined number (A), the process goes back to step 1 to sample the stopped charging terminal voltage Vst again. On the other hand, if the count in step 8 is equal to or more than the consecutive predetermined number (A), the charging is complete.

In an alternative embodiment, steps 7–8 may be omitted. Consequently, after the sampled stopping terminal voltage (Vst) equals or exceeds the predetermined voltage value (Y) in step 1, charging can be considered to be completed.

In the process of the first embodiment, the control device 2 samples the stopped terminal voltage (Vst) of the secondary batteries B, while charging is stopped. If the terminal voltage is monitored while charging is on going, the monitored terminal voltage is usually much larger than the stopped terminal voltage (Vst). This difference is usually a result of a voltage drop caused by contact resistance or by an internal resistance within the secondary batteries B, as shown FIGS. 4 and 5. Therefore, the stopped terminal voltage (Vst) provides a good indication of the charge level of the secondary batteries B.

A shorter charging period can effectively reduce the deterioration of the secondary battery. However, circuitry components which facilitate an extremely shorter charging period in the control device 2 and the switching element (SW1) can be more expensive.

As shown in FIG. 5, the terminal voltage of the lithium ion secondary battery typically stabilizes about 0.5 msec. after the switching element SW1 is turned off or on. Therefore, the time length of one charging period is preferably set to exceed 1 msec.

A charging method in accordance with a second illustrated embodiment will be described below with reference to a flow chart shown in FIG. 6. FIG. 7 shows a graph of the terminal voltage of the lithium ion battery as it is charged in accordance with this embodiment.

In the second embodiment, the charging apparatus charges the secondary battery in alternating charging periods (having a first duration Tch(n)) and constant length rest periods (Tre). The charging apparatus samples the charging terminal voltage (Vch) of the secondary battery while the battery is being charged. Then, the charging apparatus compares the sampled charging terminal voltage (Vch) with a predetermined maximum high voltage value (Vhi).

After the sampled charging terminal voltage (Vch) reaches or exceeds the predetermined high voltage value (Vhi), the charging apparatus charges the secondary battery in alternating charging and rest periods in which the charging periods have a shorter duration Tch(n+1) than the previous charging periods Tch(n). However, the duration Tre of the rest period remains constant.

When sampled charging terminal voltage (Vch) equals or exceeds the predetermined high voltage value (Vhi), the charging is approaching the full charge level. Therefore, after the sampled charging terminal voltage equals or exceeds the predetermined high voltage value (Vhi), the charging apparatus charges the secondary battery in alternating charging and rest periods in which the charging periods are shorter than the previous charging periods, in order to reduce the deterioration of the secondary battery by overcharging. Therefore, the charge amount during each charging period followed by a rest period in the vicinity of the full charge level is limited to an amount which does not cause a deterioration of the secondary battery.

Figure 6:
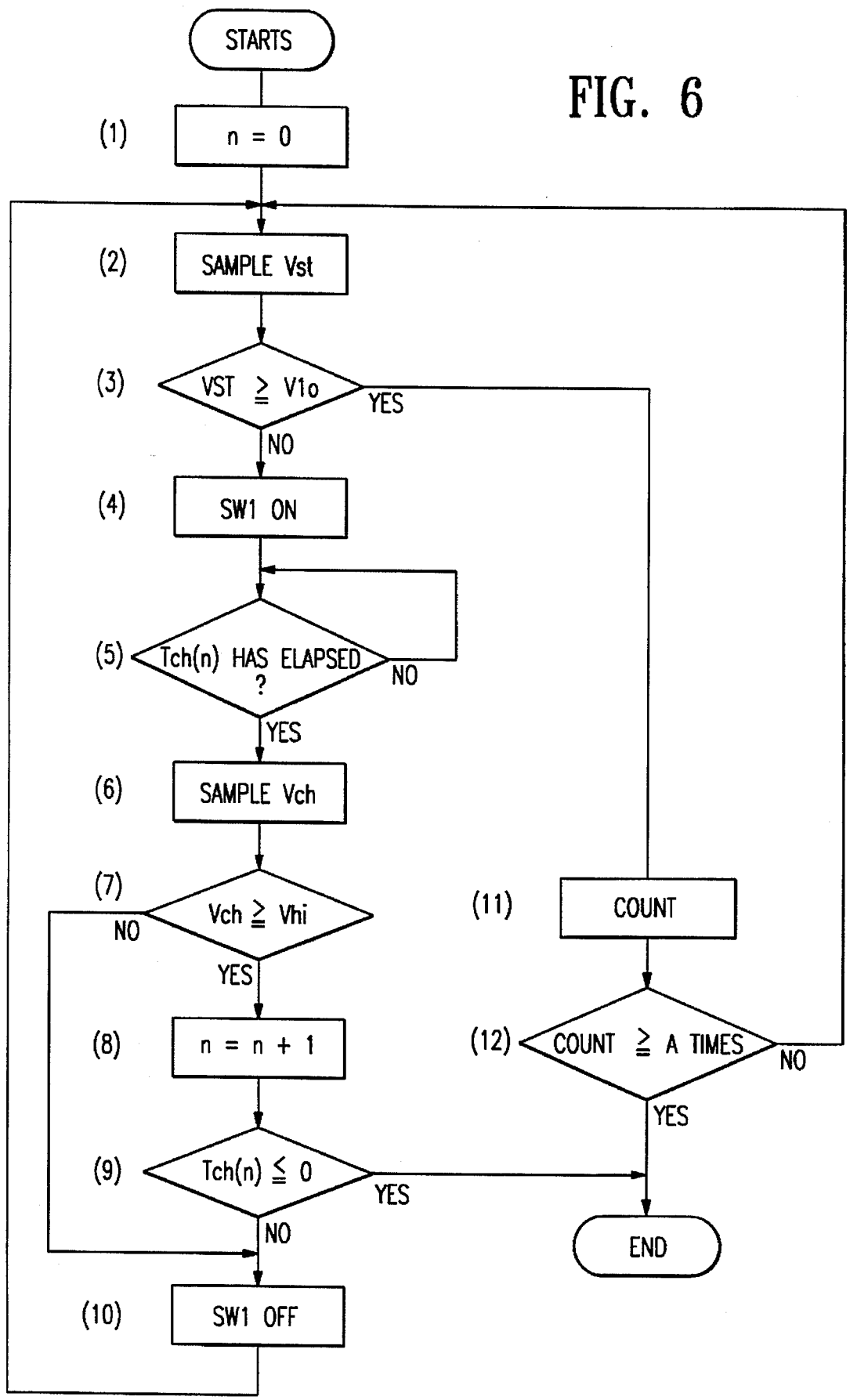
FIG. 6 is a flow chart showing a method of charging a secondary battery in accordance with a second embodiment of the present invention.
Figure 7:
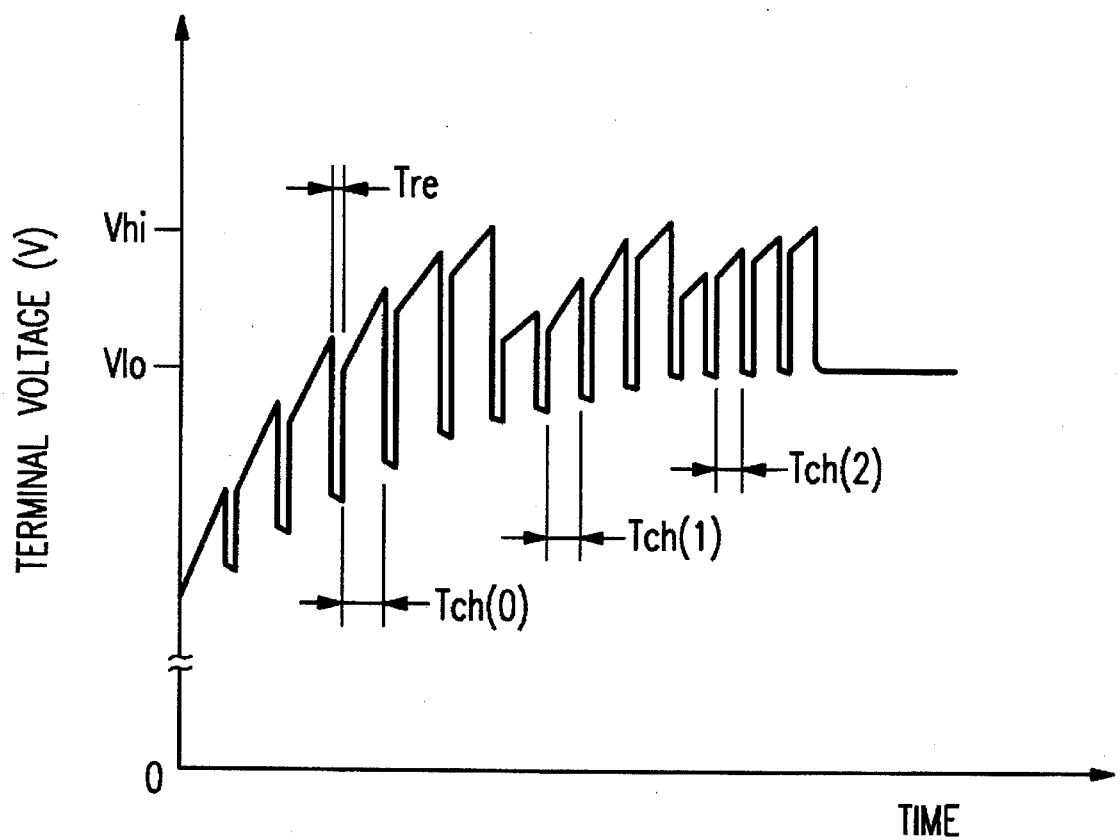
FIG. 7 is a graph of the terminal voltage of the secondary battery being charged in accordance with the second embodiment of the present embodiment.

As shown in the flow chart of FIG. 6, after the apparatus starts the process, the control device 2 initializes the number (n) in the charging periods (Tch(n)) as zero in step 1. The number (n) represents the number of times in which the charging terminal voltage of the secondary batteries B reaches the predetermined high voltage value (Vhi). Then, the control device 2 calculates the charging periods (Tch(n)), according to the following expression (1).

$$Tch(n)=50 \text{ msec.}-(5 \text{ msec.} \times n) \quad (1)$$

Thus, in the expression (1), when the number (n) is zero, the charging periods (Tch(0)) is set to 50 msec. (In an alternative embodiment, the charging periods (Tch(n)) can be calculated according to other methods such as the expression (Tch(n) =Tch(0)/n).)

In step 2, the control device 2 samples the stopped terminal voltage (Vst) of the secondary batteries B while charging is stopped. A determination is made in step 3 as to whether the sampled stopped terminal voltage (Vst) equals or exceeds the predetermined low voltage value Vlo (e.g., 8.4 V).

If the sampled stopped terminal voltage (Vst) is less than the predetermined low voltage value (Vlo), the control device 2 turns on the switching element SW1 in step 4 such that the secondary batteries B are charged with a constant current of 3C. (The "C" indicates the nominal capacity of the secondary battery. When the secondary battery has a nominal capacity of 1000 mAh, a charging current of 3C is 3A.)

A determination is made in step 5 as to whether the charging periods (Tch(n)) has elapsed. After the charging period (Tch(n)) has elapsed, the control device 2 samples the charging terminal voltage (Vch) of the secondary batteries B while they are being charged in step 6.

A determination is then made in step 7 as to whether the sampled charging terminal voltage (Vch) is equal to or less than the predetermined high voltage value Vhi (e.g., 9.0 V). If the sampled charging terminal voltage (Vch) is less than the predetermined high voltage value (Vhi), the control device 2 turns off (step 10) the switching element SW1 for the rest period (Tre), and then samples (step 2) the terminal stopping voltage Vst again. In this embodiment, the rest periods (Tre) are constant, for example, 10 msec.

On the other hand, if a determination is made in step 7 that the sampled charging terminal voltage (Vch) is equal to or greater than the predetermined high voltage value (Vhi), the number (n) is incremented by one. The control device 2 calculates the charging periods (Tch(n+1) according to the expression (1) above such that the charging periods (Tch(n+1)) are each 5 msec. shorter than the previous charging periods (Tch(n)).

A determination is made in step 9 as to whether the present charging periods (Tch(n)) are equal to or less than zero. If the charging periods (Tch(n)) are more than zero, the control devise 2 turns off (step 10) the switching element 2 to initiate a rest period and the process returns to step 2. On the other hand, if the charging periods (Tch(n)) are equal to or less than zero, the charging is complete.

If a determination is made (step 3) that the sampled stopped terminal voltage (Vst) is equal to or greater than the predetermined low voltage value (Vlo), a count is incremented in step 11. A determination is made in step 12 as to whether the sampled stopped terminal voltage (Vst) has consecutively equaled or exceeded the predetermined low voltage value (Vlo) (as represented by the count in step 11) a predetermined number of times A (e.g., 3 times). If the count in step 11 is less than the predetermined number (A), the process returns to step 2 to sample the stopped terminal voltage (Vst) again. On the other hand, if the count in step 11 is equal to or more than the predetermined number (A) indicating that the sampled stopped terminal voltage (Vst) has equaled or exceeded the predetermined low voltage value (Vlo) consecutively A times, the charging is complete (step END).

In brief, during steps 1–10, the control device 2 charges the secondary batteries B with a constant current 3C in alternating charging periods (Tch(n)) and constant rest periods (Tre), until the charging terminal voltage (Vch) reaches the predetermined high voltage value (Vhi). Each time that the charging terminal voltage (Vch) reaches the predetermined high voltage value (Vhi), the control device 2 reduces each charging period by 5 msec. as compared to the previous charging periods. The rest periods (Tre) remains constant.

Next, this process will be explained in connection with the graph of the terminal voltage shown in FIG. 7. After the charging apparatus starts the process, the control device 2 charges the secondary batteries B with a constant current 3C in alternating charging periods (Tch(0): 50 msec. ) and constant rest periods (Tre: 10 msec. ), until the charging terminal voltage (Vch) reaches the predetermined high voltage value (Vhi).

After the charging terminal voltage (Vch) reaches the predetermined high voltage value (Vhi) for the first time, the control device 2 reduces each charging period (Tch(1)) to 45 msec. which is 5 msec. shorter than the previous charging period (Tch(0)). Each subsequent time that the charging terminal voltage (Vch) reaches the predetermined high voltage value (Vhi), the control device 2 reduces the charging periods by 5 msec.

Further, the control device 2 samples the stopped terminal voltage (Vst) of the secondary batteries B during each rest period, and compares the sampled stopped terminal voltage (Vst) with the predetermined low voltage value (Vlo) which is lower than the predetermined high voltage value (Vhi). When the sampled stopped terminal voltage (Vst) equals or exceeds the predetermined low voltage value (Vlo) a consecutive number of times as represented by predetermined number (A), the battery is at the full charge level, and charging is complete.

At the beginning of each charging period, the terminal voltage of the secondary batteries B is represented in FIG. 7 as being lower than at the end of the previous charging period. The reason for this is that during the rest periods, chemical reactions in the secondary battery may stabilize, reducing the terminal voltage.

As described above in connection with the second embodiment, each time after the charging terminal voltage (Vch) reaches or exceeds the predetermined high voltage value, the durations of the charging periods are reduced as compared to the previous charging periods. However, in an alternative embodiment, the charging periods can be set to a constant value (e.g., 50 msec.). Then, each time after the charging terminal voltage (Vch) reaches or exceeds the predetermined voltage value, the rest periods (Tre(n)) can be lengthened according the following expression (2).

$$Tre(n)=10 \text{ msec.}+(10 \text{ msec.} \times n) \quad (2)$$

The lengthened rest periods (Tre(n)) according to the expression (2) can reduce or eliminate deterioration of the secondary battery caused by overcharging as the full charge level is approached.

As a further alternative embodiment, a temperature sensor can be installed to sense or detect the temperature of the secondary batteries B. Then, as the temperature of the secondary batteries B rises, the charging periods (Tch(n)) can be reduced in accordance with the expression (1), for example, or the rest periods (Tre(n)) can increase in accordance with the expression (2), for example, further modified by a temperature component. For example, the charging periods (Tch(n)) can be set according the following expression (3).

$$Tch(n)=50 \text{ msec.}-(5 \text{ msec.} \times n)-Ak \quad (3)$$

wherein K represents the temperature, and A is a constant. In addition, when the temperature sensor detects that the battery temperature is above 60° C., the control device 2 can turn off the switching element SW1 to stop charging. In yet another alternative embodiment, to reduce the deterioration of the secondary batteries B caused by overcharging, the predetermined high voltage value (Vhi) can be set to be lower value as the temperature of the secondary batteries B rises.

A charging method in accordance with a third illustrated embodiment will be described below with reference to a flow chart depicted in FIG. 8. FIG. 9 shows a graph of the terminal voltage of the lithium ion battery as it is charged in this embodiment.

In this third illustrated embodiment, the charging apparatus charges the secondary battery with a variable charging current (I(n)) in alternating constant charging periods (Tch) and constant rest periods (Tre). The charging apparatus samples a charging terminal voltage (Vch) of the secondary battery during each charging period and compares the sampled charging terminal voltage (Vch) with a predetermined high voltage value (Vhi).

When the sampled terminal voltage reaches or exceeds a predetermined high voltage value (Vhi), the charging apparatus charges the secondary battery with a smaller constant current (I(n+1)) than the previous constant current (I(n)) of the previous charging periods (Tch). When the sampled charging terminal voltage (Vch) reaches or exceeds the predetermined high voltage value (Vhi), charging is approaching the full charge level of the battery. Therefore, after the sampled charging terminal voltage (Vch) reaches or exceeds the predetermined high voltage value (Vhi), the charging apparatus charges the secondary battery with a smaller constant current than the previous constant current, in order to reduce or eliminate the deterioration of the secondary battery caused by overcharging. Therefore, the charge amount during a single charging period followed by a rest period in the vicinity of the full charge level is limited to an amount which reduces or eliminates deterioration of the cycle life of the secondary battery.

Figure 8:
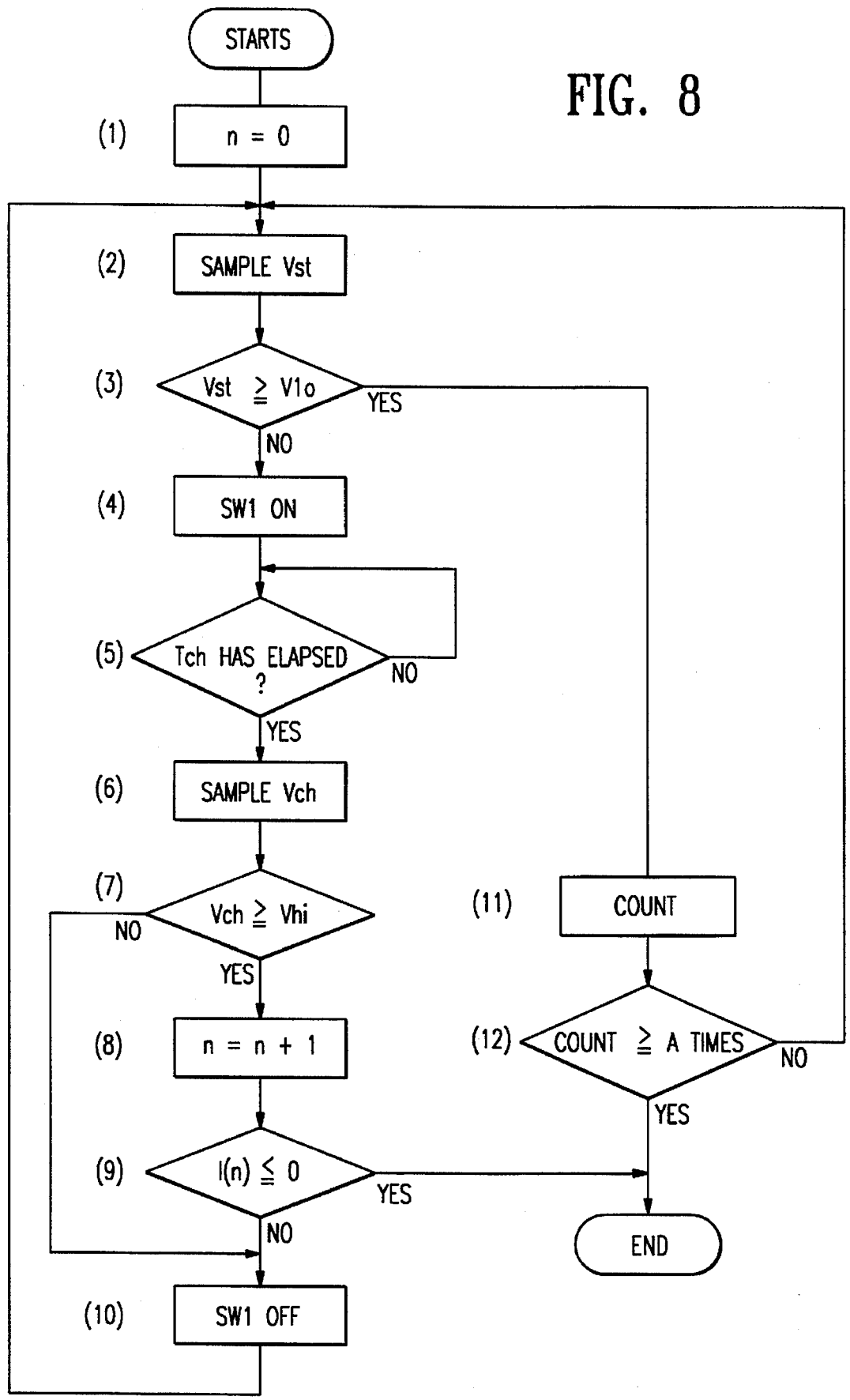
FIG. 8 is a flow chart showing a method of charging a secondary battery in accordance with a third embodiment of the present invention.
Figure 9:
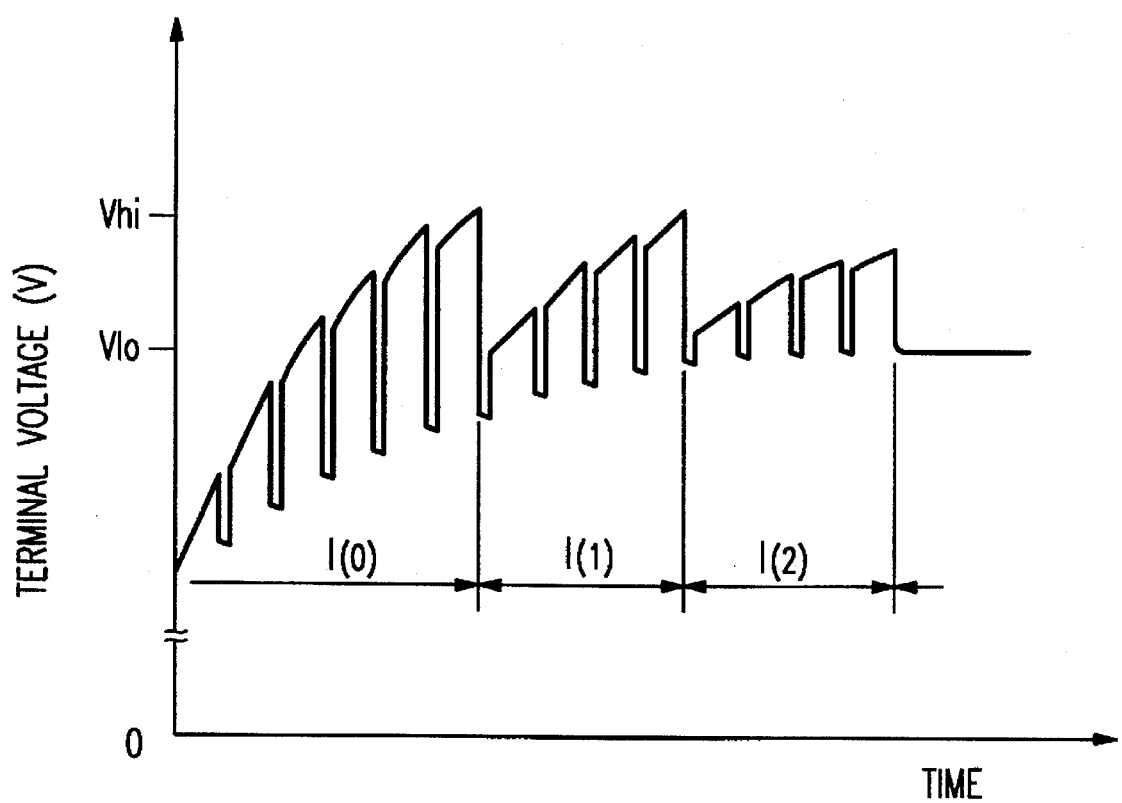
FIG. 9 is a graph of the terminal voltage of the secondary battery being charged in accordance with the third embodiment of the present embodiment.

As shown in the flow chart of FIG. 8, after the apparatus starts the process, the control device 2 initializes the number (n) of the constant charging current (I(n)) as zero in step 1. The number (n) represents the number of times in which the charging terminal voltage (Vch) of the secondary batteries B has reached the predetermined high voltage value (Vhi).

In addition, the control device 2 calculates the charging current according to the following expression (4).

$$I(n)=3C-(1C \times n) \qquad (4)$$

Thus, when the number (n) is zero, the charging current (I(0)) is set to 3C.

In step 2, the control device 2 samples the stopped terminal voltage (Vst) of the secondary batteries B during a rest period. A determination is then made in step 3 as to whether the sampled stopped terminal voltage (Vst) has reached or exceeded the predetermined low voltage value Vlo (e.g., 8.4 V).

If the sampled stopped terminal voltage (Vst) is determined to be less than the predetermined low voltage value (Vlo), the control device 2 turns on the switching element SW1 in step 4, causing the secondary batteries B to be charged with the initial charging current (I(0)) of 3C.

A determination is then made in step 5 as to whether the constant predetermined charging period (Tch: e.g., 50 msec.) has elapsed. Once the charging period (Tch) has elapsed, the control device 2 samples (step 6) the charging terminal voltage (Vch) of the secondary batteries B during charging.

A determination is made in step 7 as to whether the sampled charging terminal voltage (Vch) has reached or exceeded the predetermined high voltage value Vhi (e.g., 9.0 V). If the sampled charging terminal voltage (Vch) is less than the predetermined high voltage value (Vhi), the control device 2 turns off (step 10) the switching element SW1 for the rest period (Tre), and the process returns to sample the stopped terminal voltage (step 2). In this embodiment, the rest period (Tst) of the switching element SW1 is a constant 10 msec.

On the other hand, if a determination is made in step 7 that the sampled charging terminal voltage (Vch) has reached or exceeded the predetermined high voltage value (Vhi), the number (n) is incremented by one. Then the control device 2 reduces the charging current according to the above expression (4) such that the present charging current (I(n+1)) is reduced to 2C, a level which is 1C smaller than the level of 3C of the previous charging current (I(n)).

A determination is made in step 9 as to whether the present charging current (I(n)) is equal to or less than zero. If the charging current (I(n)) remains above zero, the control device 2 turns off (step 10) the switching element 2, and the process returns to step 2. On the other hand, if the calculated charging current (I(n)) has been reduced to a level equal to or less than zero, the process goes to the end, and the charging is complete.

In step 3, if a determination is made that the sampled stopped terminal voltage (Vst) has reached or exceeded the predetermined low voltage value (Vlo), a counter is incremented in step 11. A determination is then made in step 12 as to whether the count of step 11 is equal to or greater than a predetermined number A (e.g., 3 times). If the count in step 11 is less than the predetermined number (A), process returns to step 2 to sample the stopped terminal voltage again. On the other hand, if the count in step 11 is equal to or greater than the predetermined number (A), indicating that the sampled stopped terminal voltage has equaled or exceeded the voltage Vlo consecutively (A) number of times, the control device 2 turns off the switching element SW1, and the charging is complete.

In brief, during steps 1–10, the control device 2 charges the secondary batteries B with a sequentially reduced charging current (I(n)) in alternating constant charging periods (Tch) and constant rest periods (Tre), until the charging terminal voltage (Vch) reaches the predetermined high voltage value (Vhi). Each time after the charging terminal voltage (Vch) reaches the predetermined high voltage value (Vhi), the control device 2 charges the secondary battery B with a charging current reduced by 1C as compared to the previous charging current.

Next, this process will be explained in connection with the graph depicted in FIG. 9 of the battery terminal voltage. After the charging apparatus starts the process, the control device 2 charges the secondary batteries B with an initial charging current I(0) (e.g., 3C) in alternating constant charging periods (Tch) and constant rest periods (Tre), until the charging terminal voltage (Vch) reaches a predetermined high voltage value (Vhi).

After the charging terminal voltage (Vch) reaches the predetermined high voltage value (Vhi) for the first time, the control device 2 charges the secondary batteries B in alternating constant charging and rest periods with a charging current (I(1) (e.g., 2C) which is reduced by 1C as compared to the previous charging current (I(0)). Then, after the charging terminal voltage (Vch) reaches the predetermined high voltage value (Vhi), the control device 2 charges the secondary battery B in alternating constant charging and rest periods with a charging current (I(2) (e.g., 1C) which is reduced again by 1C as compared to the previous charging current (I(1)).

The control device 2 also samples the stopping terminal voltage (Vst) of the secondary batteries B during each rest period and compares the sampled stopping terminal voltage (Vst) to a predetermined low voltage value (Vlo) which is lower than the predetermined high voltage value (Vhi). Charging is complete when the sampled stopping terminal voltage (Vst) reaches or exceeds the predetermined low voltage value (Vlo) for a consecutive predetermined number of times (e.g., 3 times).

In another alternative embodiment, a temperature sensor may be installed to detect the temperature of the secondary batteries B. Then, as the temperature of the secondary batteries B rises, the charging current (I(n)) can be further reduced from the value calculated by expression (4), according to the following expression (5).

$$I(n) = 3C - (1C \times n) - Dk \qquad (5)$$

wherein K is the temperature, and D is a constant. In addition, when the temperature sensor detects that the temperature of the secondary batteries B has exceeded 60° C., for example, the control device 2 can turn off the switching element SW1 to stop charging. In yet another alternative embodiment, to reduce the deterioration of the secondary batteries B caused by overcharging, the predetermined high voltage value (Vhi) can be set to be lower value as the temperature of the secondary batteries B rises.

The second and third illustrated embodiments may be summarized as follows. Each time the sampled charging terminal voltage reaches or exceeds the predetermined high voltage value, the average charge amount supplied to the secondary batteries over each combined charging period and rest period, is reduced as compared to average charge amount before the sampled charging terminal reaches the predetermined high voltage value.

Figure 11:
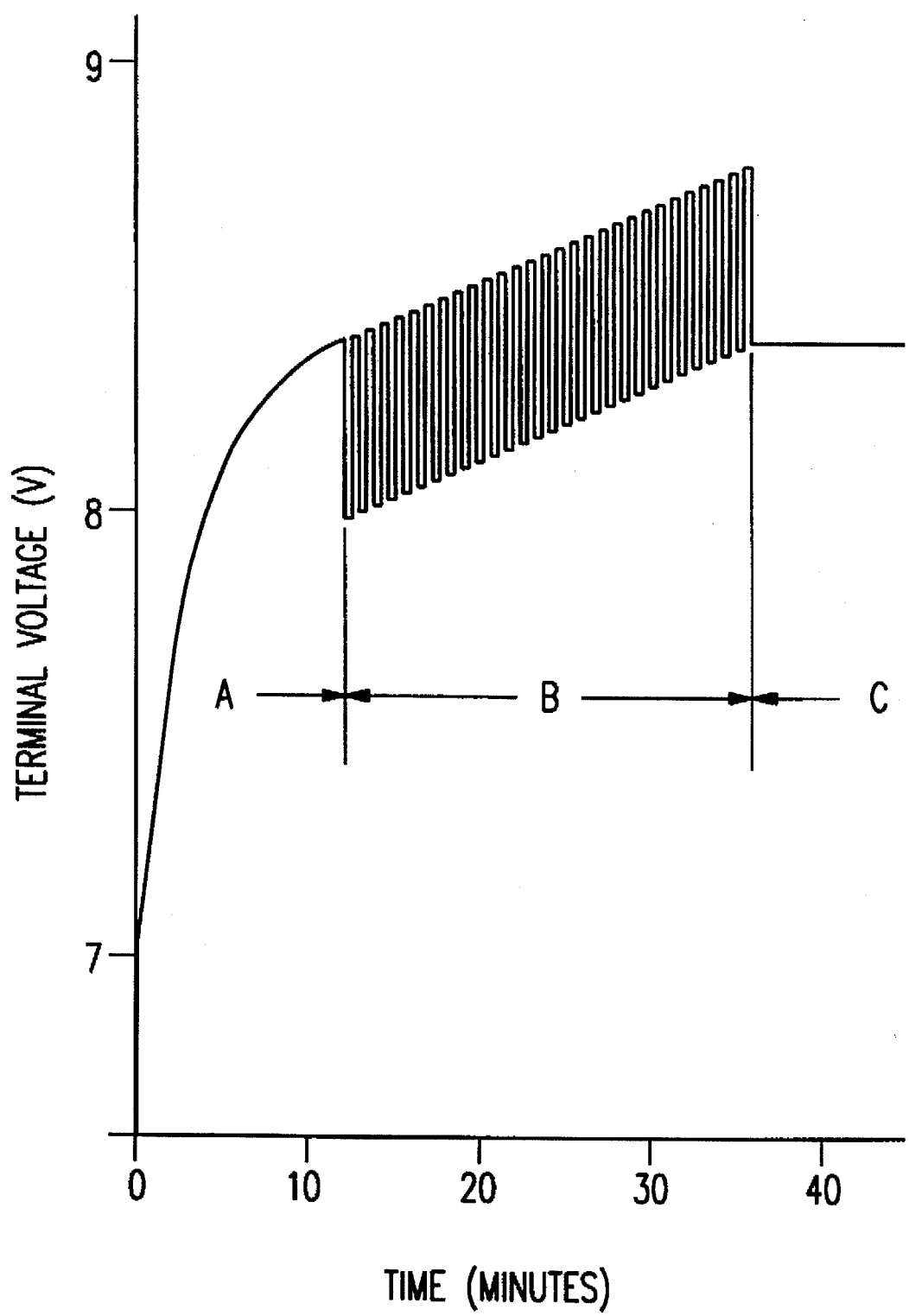
FIG. 11 is a graph of the terminal voltage of the secondary battery being charged in accordance with the fourth embodiment of the present embodiment.
Figure 12:
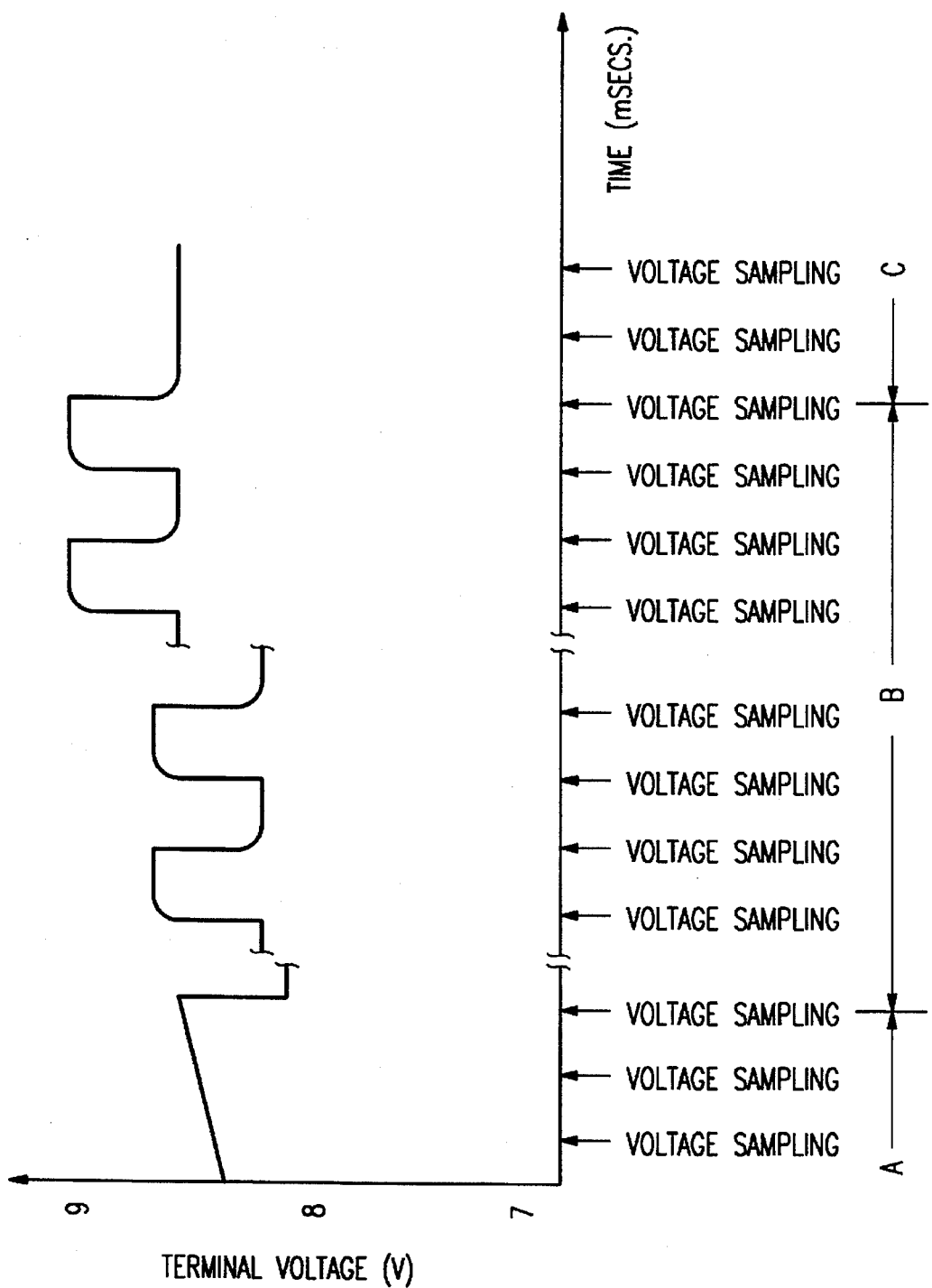
FIG. 12 is a detailed graph of FIG. 11 which has a lengthened time axis.

A charging method in accordance with a fourth illustrated embodiment will be described below with reference to a flow chart depicted in FIG. 10. FIG. 11 shows a graph of the terminal voltage of a lithium ion battery as it is charged in accordance with this embodiment. FIG. 12 shows a more detailed portion of the graph of FIG. 11 in which the time axis has been lengthened.

In the fourth embodiment, the charging apparatus charges the secondary battery with a constant current, and samples the terminal voltage (V) of the secondary battery periodically. Then, the charging apparatus compares the sampled terminal voltage with a predetermined voltage value (Y).

When the sampled terminal voltage (V) reaches or exceeds the predetermined voltage value (Y), the charging apparatus stops charging. On the other hand, if the sampled terminal voltage (V) has not reached the predetermined voltage value (Y), the charging apparatus resumes charging the secondary battery with the constant current.

This process will be explained in connection with the graph of the terminal voltage of the secondary battery shown in FIGS. 11 and 12. Immediately following the initiation of charging, the sampled terminal voltage (V) will not have reached the predetermined terminal voltage (Y). Therefore, the charging apparatus continues charging. This interval is referred to as interval A in FIG. 11.

Then, when the sampled terminal voltage (V) reaches the predetermined voltage value (Y) for the first time, the charging apparatus stops charging. In the next sampling, as the charging apparatus samples the terminal voltage (V) of the secondary battery while charging is stopped, the sampled terminal voltage (V) will be less than the predetermined voltage value (Y). Therefore, the charging apparatus resumes charging. During this interval referred to as interval B in FIGS. 11 and 12, the sampled terminal voltage (V) during charging remains equal to or greater than the predetermined voltage value (Y) and the sampled terminal voltage (V) while charging is stopped remains less than the predetermined voltage value (Y). Therefore, each time the charging apparatus samples the terminal voltage (V) of the secondary battery, the switching element SW1 changes state (i.e., is turned off or on) such that the charging apparatus repetitively switches back and forth between charging and stopping charging within the interval B. Referring to interval C of FIGS. 11 and 12, when the terminal voltage (V) sampled while charging is stopped becomes equal to or greater than the predetermined voltage value (Y), the charging is complete.

The charge amount supplied to the battery in one sampling period is preferably limited to an amount which does not cause deterioration of the secondary battery as the full charge level is approached. For example, if the secondary battery should be fully charged right after charging starts, a charging circuit in accordance with this invention can reduce the deterioration of the secondary battery caused by overcharging.

With respect to a charge amount which does not cause a deterioration of the secondary battery near the full charge level, for a lithium ion secondary battery, the charge amount supplied during a charging period is preferably limited to 5% of the full charge amount. More preferably, the charge amount during a charging period is limited to 3%. Still more preferably, the charge amount during a charging period is limited to 1%. For example, when the lithium ion secondary battery has a full charge amount 1000 mAh, 5% of this amount is 50 mAh. Therefore, if the charging current is 2A, the charging period is set to 90 sec (=25 mh) in order to limit the charge amount to 5% of a full charge. In addition, when the charge amount during a charging period is limited to 1% of the full charge amount of 1000 mAh, the charging period is limited to 18 sec (=5 mh).

Figure 10:
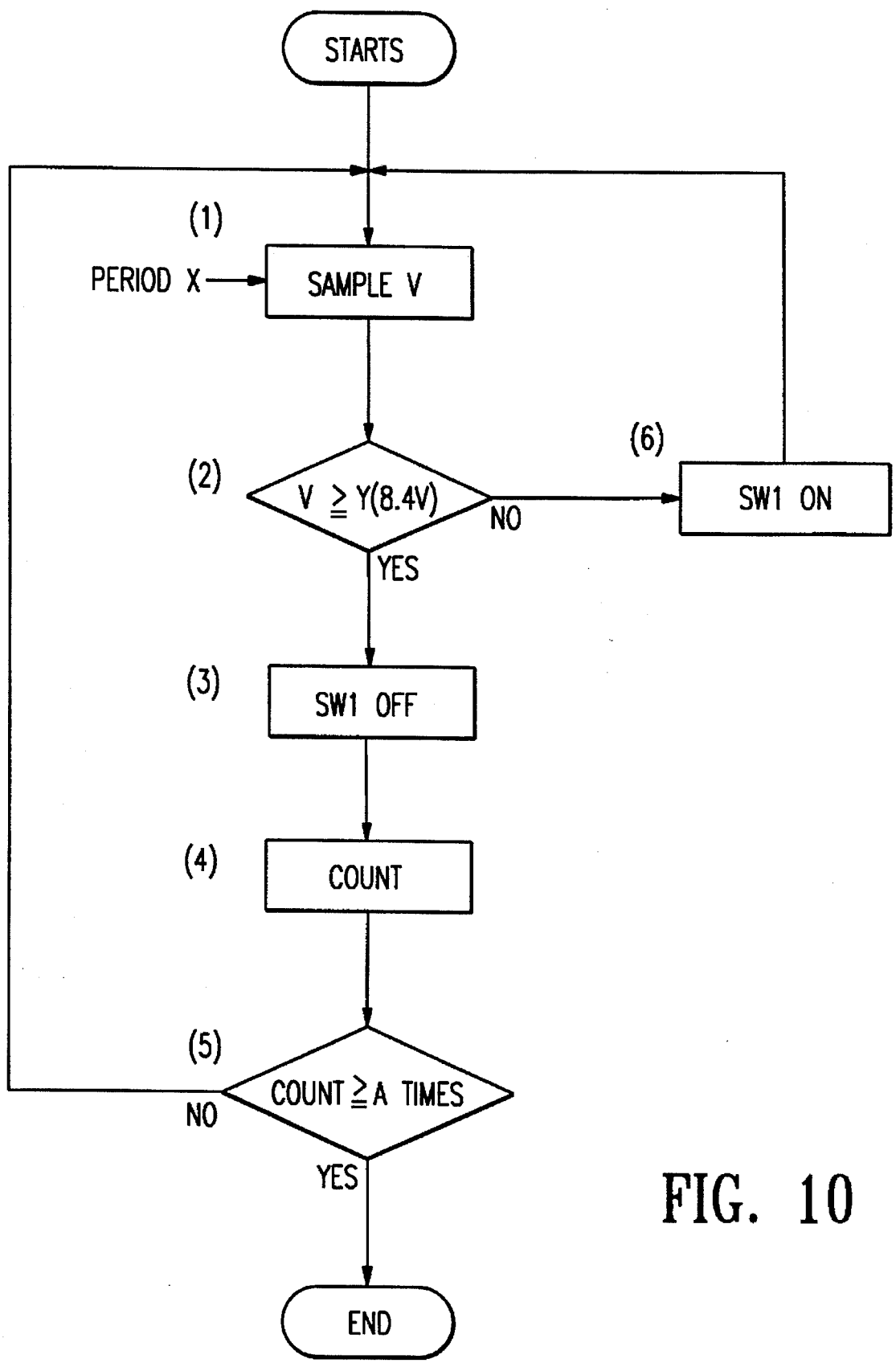
FIG. 10 is a flow chart showing a method of charging a secondary battery in accordance with a fourth embodiment of the present invention.

As shown in the flow chart of FIG. 10, after the control device 2 starts the process, the control device 2 periodically samples the terminal voltage (V) of the secondary batteries B at a fixed period X (e.g., 3 msec.) in step 1. A determination is made in step 2 as to whether the sampled terminal voltage (V) is equal to or more than a predetermined voltage value Y (e.g., 8.4 V). If the sampled terminal voltage (V) is less than the predetermined value (Y), the control device 2 turns on the switching element SW1 in step 6. As shown in FIGS. 11 and 12, during the early stage of interval A, the sampled terminal voltage (V) during charging is less than the predetermined voltage value. As a result, the switching element SW1 is kept on, and the secondary batteries B are continuously and rapidly charged.

Once the sampled terminal voltage (V) during charging reaches or exceeds the predetermined voltage value (Y), the control device 2 turns off the switching element 2 in step 3. At this point, interval B (FIGS. 11 and 12) begins. A counter is then incremented in step 4 to keep track of the number of consecutive times the switch SW1 is turned off. The counter (not shown) is installed in the control device 2.

A determination is then made in step 5 as to whether the count in step 4 (representing consecutive times the switch SW1 is turned off) is equal to or greater than a predetermined number (A). When the count in step 4 is less than the predetermined number (A), the process returns to step 1. Then, while charging is stopped, the control device 2 samples the terminal voltage (V) in step 2. During interval B, the terminal voltage sampled while the charging is stopped is generally rising each time it is sampled but the terminal voltage has not yet reached the predetermined voltage value. Hence, each time the terminal voltage is sampled while charging is stopped, the switch SW1 is turned on again (step 6) to resume charging. In addition, the counter is reset. Following the resumption of charging, the terminal voltage is sampled after the predetermined period X in step 1. During interval B, the terminal voltage sampled during charging remains above the predetermined voltage value Y. Hence, each time the terminal voltage is sampled while charging is ongoing in interval B, the switch SW1 is turned off (step 3) and, the counter is incremented (step 4). Because the counter was reset in the prior step 6, the count remains below the predetermined count value A as determined in step 5 until the end of interval B. In this manner, the charging is alternately turned on and turned off as shown in FIGS. 11 and 12 during interval B.

Once the terminal voltage sampled while the charging is stopped reaches the predetermined voltage value Y (step 2), the counter is incremented in step 4 rather than being reset in step 6. If the sampled terminal voltage is sampled at or above the voltage value Y A times or more consecutively while charging is stopped (step 5), charging is complete. In an alternative embodiment, after the charging apparatus completes charging for the first time, if the terminal voltage (V) becomes less than the predetermined voltage value (Y), for example, because of a self-discharge, the charging apparatus can resume charging.

Charging during a shorter sampling period can effectively reduce the deterioration of the secondary battery. However, parts which realize an extreme shorter sampling period in the control device 2 and the switching element (SW1) can be expensive.

As shown in FIG. 12, the terminal voltage of the lithium ion secondary battery generally stabilizes about 0.5 msec. after the switching element SW1 is turned off or on. Therefore, the time length of one period is preferably set at at least 1 msec.

In the above mentioned embodiments, the charging apparatus samples the series-connected terminal voltage of the secondary batteries B which are connected in series. In an alternative embodiment, the charging apparatus can sample the terminal voltage of each of the secondary batteries B individually. Hence, when the terminal voltage of one of the secondary batteries B reaches the predetermined voltage value, the apparatus can terminate charging.

It will, of course, be understood that modifications of the present invention, in its various aspects will be apparent to those skilled in the art, some being apparent only after study and others being matters of routine electronic design. As such, the scope of the invention should not be limited by the particular embodiments herein described but should be defined only by the appended claims and equivalent thereof.

What is claimed is:

1. A method of charging a secondary battery, comprising:
    charging the secondary battery with a current in alternating charging and rest periods in which a charge amount is supplied to the battery during a charging period and the charging is stopped in the rest periods;
    sampling a stopping charge terminal voltage of the secondary battery while charging is stopped;
    comparing the sampled stopping charge terminal voltage with a first predetermined voltage value; and
    completing charging, when the sampled stopping charge terminal voltage is equal to or more than the predetermined voltage value,
    wherein the charging amount supplied to the battery as the battery charge level approaches a full charge level is restricted to a charge amount which reduces deterioration of the secondary battery.

2. A method according to claim 1, wherein the charge amount supplied to the battery during each charging period is equal to or less than 5% of a full charge amount of the secondary battery.

3. A method according to claim 1, wherein the charge amount supplied to the battery during each charging period is equal to or less than 3% of a full charge amount of the secondary battery.

4. A method according to claim 1, wherein the charge amount supplied to the battery during each charging period is equal to or less than 1% of a full charge amount of the secondary battery.

5. A method according to claim 1 further comprising:
    sampling a charging terminal voltage of the secondary battery while the battery is charging;
    comparing the sampled charging terminal voltage with a second predetermined voltage value which is higher than the first predetermined voltage value; and
    reducing the duration of each of the charge periods after the sampled charging terminal voltage reaches or exceeds the second predetermined value.

6. A method according to claim 1 further comprising:
    sampling a charging terminal voltage of the secondary battery while the battery is charging;
    comparing the sampled charging terminal voltage with a second predetermined voltage value which is higher than the first predetermined voltage value; and
    increasing the rest periods after the sampled charging terminal voltage reaches or exceeds the predetermined high voltage value.

7. A method according to claim 1 further comprising:
    sampling a charging terminal voltage of the secondary battery during a charging period;
    comparing the sampled charging terminal voltage with a second predetermined voltage value which is higher than the first predetermined voltage value; and
    reducing the charging current to reduce the charge amount in each charging period, after the sampled charging terminal voltage reaches or exceeds the second predetermined voltage value.

8. A method of charging a secondary battery, comprising:
    charging the secondary battery with a current in alternating charging and rest periods in which the battery is charged with a first charge amount in each charging period and the charging is stopped in the rest periods;
    sampling a charging terminal voltage of the secondary battery while the battery is charging;
    comparing the sampled charging terminal voltage with a first predetermined voltage value; and
    charging the secondary battery in alternating charging and rest periods in which the secondary battery is charged with a second charge amount in combined charging and rest periods, which is less than the first charge amount, after the sampled charging terminal voltage reaches or exceeds the first predetermined voltage value.

9. A method according to claim 8, wherein the charging periods of the second charge amount are shorter than the charging periods of the first charge amount.

10. A method according to claim 8, wherein the rest periods of the second charge amount are longer than the rest periods of the first charge amount.

11. A method according to claim 8, wherein the current level of the charging periods of the second charge amount is lower than the current level of the charging periods of the first charge amount.

12. A method according to claim 8, further comprising:

sampling a stopping charge terminal voltage of the secondary battery while charging of the battery is stopped; and comparing the sampled stopping charge terminal voltage with a second predetermined voltage value which is lower than the first predetermined voltage value; and terminating charging when the sampled stopping charge terminal voltage reaches or exceeds the second predetermined voltage value.

13. A method of charging a secondary battery, comprising:

charging the secondary battery with a constant current;

periodically sampling a terminal voltage of the secondary battery;

comparing the sampled terminal voltage with a predetermined voltage value;

stopping charging, when the sampled terminal voltage is equal to or higher than the predetermined voltage value; and resuming charging of the secondary battery, when the sampled terminal voltage is less than the predetermined voltage value;

wherein the charge amount supplied to the battery in one sampling period is limited to a predetermined amount which reduces or eliminates deterioration of the secondary battery as charging of the secondary battery approaches a full charge level.

14. A method according to claim 13, wherein the predetermined charge amount is equal to or less than 5% of a full charge amount of the secondary battery.

15. A method according to claim 13, wherein the predetermined charge amount is equal to or less than 3% of a full charge amount of the secondary battery.

16. A method according to claim 13, wherein the predetermined charge amount is equal to or less than 1% of a full charge amount of the secondary battery.

17. A method of charging a secondary battery, comprising:

charging the secondary battery with a current in alternating charging and rest periods in which the battery is charged in the charging periods and the charging is stopped in the rest periods;

sampling a charging terminal voltage of the secondary battery while the battery is charging;

comparing the sampled charging terminal voltage with a first predetermined voltage value; and increasing the rest periods after the sampled charging terminal voltage reaches or exceeds the first predetermined voltage value.

18. A method according to claim 17, further comprising:

sampling a stopping charge terminal voltage of the secondary battery while charging of the battery is stopped; and comparing the sampled stopping charge terminal voltage with a second predetermined voltage value which is lower than the first predetermined voltage value; and terminating charging when the sampled stopping charge terminal voltage reaches or exceeds the second predetermined voltage value.

19. An apparatus for charging a secondary battery having a predetermined full charage level and a terminal, comprising:

charging means for charging the secondary battery with a current in alternating charging and rest periods to a charge level in which a charging amount is supplied to the battery during a charging period and the charging is stopped in the rest periods;

sampling means for sampling a stopping charge terminal voltage of the secondary battery while charging is stopped;

detecting means for comparing the sampled stopping charge terminal voltage with a first predetermined voltage value, and for generating a signal when the sampled stopping charge terminal voltage is equal to or more than the predetermined voltage value; and control means responsive to the signal for terminating charging;

wherein the charging amount supplied to the battery as the charge level approaches the full charge level is restricted to a charge amount which reduces deterioration of the secondary battery.

20. A method according to claim 19, wherein the charge amount supplied to the battery during each charging period is equal to or less than 5% of a full charge level of the secondary battery.

21. A method according to claim 19, wherein the charge amount supplied to the battery during each charging period is equal to or less than 3% of a full charge level of the secondary battery.

22. A method according to claim 19, wherein the charge amount supplied to the battery during each charging period is equal to or less than 1% of a full charge level of the secondary battery.

23. A method of charging a secondary battery, comprising:

charging the secondary battery with a current in alternating charging and rest periods in which the battery is charged with a first average charge amount over combined charging and rest periods in which charging is stopped or reduced in the rest periods;

sampling a charging terminal voltage of the secondary battery while the battery is charging;

comparing the sampled charging terminal voltage with a first predetermined voltage value;

charging the secondary battery with a current in alternating charging and rest periods in which the secondary battery is charged with a second average charge amount over combined charging and rest periods, which is less than the first average charge amount, after the sampled charging terminal voltage reaches or exceeds the first predetermined voltage value.

24. A method according to claim 23, wherein the charging periods in the second average charge amount are shorter than the charging periods in the first average charge amount.

25. A method according to claim 23, wherein the rest periods in the second charge amount are longer than the rest periods in the first average charge amount.

26. A method according to claim 23, wherein the current level of the charging periods in the second average charge amount is lower than the current level of the charging periods in the first average charge amount.

* * * * *